United States Patent Office 3,009,877
Patented Nov. 21, 1961

3,009,877
STABILIZED LUBRICANT COMPOSITION
John M. Nielsen, Schenectady, N.Y., assignor to General Electric Company, a corporation of New York
No Drawing. Filed Dec. 17, 1959, Ser. No. 860,088
9 Claims. (Cl. 252—37.2)

This invention relates to an organopolysiloxane lubricant composition and to its preparation. More particularly, this invention relates to alkylchlorophenyl organopolysiloxane fluids which are stabilized with both an iron salt stabilizing agent and a high-boiling hydrocarbon stabilizing agent.

Heretofore silicone fluids of various types have been known in the art and have found extensive use as hydraulic fluids and lubricants where service at temperatures above the conventional operating temperatures of hydrocarbon fluids has been require. The most common of these silicone materials are the methyl silicone fluids such as described in Patent 2,469,888, Patnode. While the fluids of the aforementioned Patnode patent are satisfactory in many applications, they have been found somewhat deficient when extended use in contact with air at elevated temperatures, such as temperatures of the order of 225 to 300° C. has been required. At these temperatures there is the tendency for these methyl silicone fluids to gel after extended use. Another disadvantage of the methyl silicone fluids of the Patnode patent has been the lack of good lubricity particularly in systems where extreme pressure lubricating characteristics have been required.

In order to obviate the shortcomings of these methyl silicone fluids, organopolysiloxane fluids have been prepared which contain both silicon bonded lower alkyl radicals and silicon bonded polychlorophenyl radicals. These alkyl chlorophenyl silicones have been stable in air at temperatures higher than the conventional methyl silicone fluids and have had a much higher lubricity than the conventional methyl silicone fluids. Thus where temperatures higher than the usual operating temperatures of methyl silicone fluids have been required, particularly in environments where lubricity has been required, alkyl chlorophenyl fluids have been employed instead of these methyl silicone fluids.

While these alkyl chlorophenyl fluids represent a marked improvement, the fluids have still been subject to several defects. While the lubricity of the alkyl chlorophenyl fluids has been very satisfactory it has been found that there is still a tendency for the alkyl chlorophenyl fluid to gel on prolonged exposure to air at temperatures of the order of 225 to 300° C. One method of improving the stability of these alkyl chlorophenyl fluids has been by incorporating therein some of the metal salts of organic carboxylic acids as disclosed in Patent 2,445,567, Elliott. In particular, the most useful of these additives has been iron octoate and in fact commercial iron octoate-containing methylchlorophenyl fluids have been used successfully in a number of applications. While the presence of the iron octoate in alkyl chlorophenyl fluids, such as methylchlorophenyl fluids, has substantially improved the oxidative stability and fluid life before gelation upon extended use at temperatures of 225 to 300° C., it has been found that the presence of the iron octoate in the methylchlorophenyl fluid causes the formation of a haze or a sludge in the fluid. This haze or sludge is, of course, undesirable and is particularly bad when the iron octoate-stabilized alkyl chlorophenyl fluids have been used in systems where lubricity has been required, since the sludge interferes with the lubricating action of the fluid and also interferes with the flow of the fluid in hydraulic systems.

In my copending application Serial No. 842,553, filed September 28, 1959, and assigned to the same assignee as the present invention, there is described and claimed an improved stabilized alkylchlorophenyl silicone fluid which is free of the haze or sludge referred to above. The invention of the aforementioned application is based on my discovery that an improved stabilized alkylchlorophenyl silicone fluid can be prepared by first forming a concentrate of iron octoate in the alkylchlorophenyl fluid, then oxidizing the resulting mixture at the temperature at which the fluid is designed to operate by passing an oxygen-containing gas through the mixture, thereafter cooling the aerated fluid to room temperature and filtering the resulting precipitate-containing material to produce a filtrate which serves as a concentrate. This concentrate (which is referred to hereinafter as an "iron salt stabilizer") is then added to additional amounts of the alkylchlorophenyl silicone fluid and results in fluids which are resistant to gelation at temperatures of the order of 225 to 300° C. for extended periods of time without the formation of any haze or sludge in the fluid during its operating life.

While the method of my aforementioned copending appliaction provides a group of extremely useful high temperature organopolysiloxane fluids for use in lubricating applications and in hydraulic fluid applications, these fluids are still lacking in the degree of oxidative stability which is desired. The present invention is based on my discovery that an alkylchlorophenyl silicone fluid of even greater oxidative stability than the fluids described in my areforementioned copending application are prepared by adding to the fluids of my aforementioned application a hydrocarbon stabilizing agent selected from the class consisting of mineral spirits having a boiling point of at least 200° C. and fused ring polycyclic aromatic hydrocarbons having at least three fused rings and having a melting point no higher than about 200° C. and a boiling point of at least about 200° C. and having a room temperature solubility of at least 0.005 percent by weight in the alkylchlorophenyl silicone fluid.

Unexpectedly, I have found that the alkylchlorophenyl organopolysiloxanes of the present invention have an oxidative stability which is far superior to the oxidative stability of the stabilized alkylchlorophenyl organopolysiloxanes described in my aforementioned copending application as well as an oxidative stability which is far superior to the oxidative stability of alkylchlorophenyl organopolysiloxane fluids containing as a sole stabilizer the hydrocarbon stabilizing agents which are employed in the practice of the present invention.

The hydrocarbon stabilizing agents employed in the practice of the present invention are well known in the art and are commercially available materials. The mineral spirits having a boiling point of at least 200° C. are commercially available under a number of trade names. Products which are particularly valuable as mineral spirits stabilizing agents include Shell's 82,000, 82,020, and 82,030. Phillips Petroleum Company's Soltrol 170 has a minimum boiling point of 420° F., while the three Shell products have minimum boiling points of 400, 416, and 418° F. respectively. Among the many fused polycyclic aromatic hydrocarbons of at least three rings which have a melting point no higher than 200° C., a boiling point of at least 200° C., and a room temperature solubility of at least 0.05 percent by weight in alkylchlorophenyl organopolysiloxane fluids can be mentioned, for example, 1,1'-binaphthyl, 1,2-benzanthracene, fluoranthene, benzo(a)pyrene, pyrene, phenanthrene, acenaphthene, etc.

Since the stabilized alkylchlorophenyl organopolysiloxane fluid of my aforementioned copending application is employed in the practice of the present invention, my aforementioned copending application is hereby incorporated by reference into the present application for the purpose of describing the various alkylchlorophenyl organopolysiloxane fluids which are employed in the practice of the present invention, the iron salt stabilizing agents employed in the practice of the present invention, and the method of preparing the iron-containing stabilized alkylchlorophenyl organopolysiloxane fluids which are employed in the practice of the present invention.

While details of the alkylchlorophenyl organopolysiloxanes are described in my aforementioned copending application, it can be stated that these fluids have the formula (1) $(R)_n SiO_{\frac{4-n}{2}}$ where R represents both a lower alkyl radical, e.g., an alkyl radical containing from 1 to 7 carbon atoms, such as methyl, ethyl, butyl, hexyl, etc. radicals and chlorinated phenyl radicals in which the chlorinated phenyl radicals contain an average of from 3 to 5 chlorine atoms per phenyl nucleus, and the chlorinated phenyl radicals constitute from 1 to 7 percent of the total number of alkyl and chlorophenyl radicals, and $n$ has an average value of from about 2.01 to 2.5, the lower alkylchlorophenylpolysiloxane fluid having a viscosity of from about 10 to 100,000 centipoises, e.g., from 15 to 5,000 centipoises when measured at 25° C. These alkylchlorophenyl silicones are preferably methylchlorophenyl silicones and can be prepared by the various methods described in my aforementioned copending application. Preferably, the lower alkylchlorophenylsiloxane fluid should have a viscosity of from about 30 to 1,000 centipoises when measured at 25° C.

The iron-containing stabilized alkylchlorophenyl polysiloxane fluids of my aforementioned copending application are prepared by adding to these fluids a concentrate which consists of the product obtained by mixing an alkylchlorophenyl silicone fluid with an iron salt of an organic carboxylic acid and thereafter passing an oxygen-containing gas through the mixture at a temperature at which the alkylchlorophenyl polysiloxane fluid is to be used. Included among the iron salts of organic carboxylic acids which can be employed in the practice of the present invention are those aliphatic and aromatic acids which are described in my copending application. Preferably, the iron salt employed is iron octoate (2-ethyl hexoate). The iron salt can be employed in the pure form when such form is available, and can also be employed in the form of a solution or a paste in an inert solvent. For example, when employing iron octoate it is preferred to employ the iron in one of its commercially available forms such as a 6 percent by weight solution of iron as iron octoate in mineral spirits or a 15 percent iron by weight paste formed by mixing mineral spirits with iron octoate. In beginning the preparation of the iron concentrate, the iron salt is merely added to an alkylchlorophenyl polysiloxane fluid in the required amount and the mixture or suspension is stirred to form as homogeneous a mixture as possible. The amount of the iron salt which is added to the fluid can vary within wide limits. However, optimum results are obtained when from 0.1 to 2.5 parts by weight of iron as the iron salt per 100 parts of the lower alkylchlorophenylpolysiloxane fluid are employed. The preferred concentration of the iron is from 0.3 to 1.5 parts, by weight, of the iron as the iron salt per 100 parts of the fluid.

After mixing the iron salt into the lower alkylchlorophenylpolysiloxane and forming as homogeneous a mixture as possible, the mixture is heated to the temperature at which it is desired to operate the fluid to which the concentrate is added or to a higher temperature, such as a temperature up to 320° C. Since the primary utility of lower alkylchlorophenylpolysiloxane fluid is in operation at temperatures of from about 225 to 300° C., it is preferred to heat the concentrate to this temperature range. While this concentrate mixture is being heated to the ultimate temperature or after the concentrate reaches the ultimate temperature, the concentrate is "aerated" by bubbling therethrough an oxygen-containing gas. Preferably, the oxygen is bubbled through the concentrate in the form of air since this is obviously the most convenient method of supplying oxygen to the concentrate. The time required for the aeration of the concentrate is relatively short, with aeration accomplished in as little as 5 minutes. Times up to several hours have been used for the aeration with no adverse effects. After the aeration is completed, the concentrate is cooled to some temperature below the aeration temperature, such as a temperature of from 25 to 100° C. and the precipitate is filtered from the reaction mixture, resulting in a homogeneous filtrate which is the iron salt stabilizer.

The stabilized alkylchlorophenyl organopolysiloxane fluids of the present invention contain both the iron salt stabilizer and the hydrocarbon stabilizer referred to above. The order of addition of the iron salt concentrate and the hydrocarbon stabilizer to the alkylchlorophenyl fluid is unimportant. To add the iron salt stabilizer to the alkylchlorophenylpolysiloxane fluid, the stabilizer and the fluid are merely mixed together. While the amount of stabilizer employed varies depending on the desired results, it has been found that satisfactory results are obtained when using from 0.5 to 10 parts by weight and preferably from 1.5 to 6.5 parts by weight of the iron salt stabilizer per 100 parts of the lower alkylchlorophenylpolysiloxane fluid. The hydrocarbon stabilizer is added to the alkylchlorophenyl fluid, which may or may not contain the iron salt stabilizer, by one of two methods. Where the hydrocarbon stabilizer is the high boiling mineral spirits previously described, the mineral spirits is merely added to the alkylchlorophenylorganopolysiloxane fluid by mixing the two ingredients together. Where the hydrocarbon stabilizer is one of the fused polycyclic aromatic hydrocarbon compounds described above, the stabilizer is added to the fluid, and the mixture is heated to an elevated temperature, such as the melting point of the polycyclic hydrocarbon, and maintained at this temperature, preferably with agitation, for a time sufficient to allow the stabilizer to dissolve in the alkylchlorophenyl organopolysiloxane fluid, which usually takes a time on the order of from 5 minutes to 1 hour.

Regardless of whether the hydrocarbon stabilizer is the mineral spirits or the polycyclic aromatic hydrocarbon, the hydrocarbon stabilizer is added to the fluid in an amount equal to from about 0.01 to 1 percent by weight based on the weight of the alkylchlorophenyl polysiloxane fluid. A preferred range of addition is from 0.05 to 0.2 percent by weight of the hydrocarbon stabilizer based on the weight of the alkylchlorophenyl organopolysiloxane fluid.

Several methods are available for measuring the oxidative stability of organopolysiloxane fluids. Of these methods, three are particularly important and each of the three methods serves as a definite measure of the stability of organopolysiloxanes at elevated temperatures. The first of these tests is a gel time test in which the fluid is maintained in an open beaker at 250° C. in an air-circulating oven and the time required for gelation of the fluid is recorded. The second of these tests is an oxidation test in which the fluid is maintained at 260° C. while air is bubbled through the fluid at a controlled rate to determine the time required for the viscosity of the fluid to double. The third test is the panel coke test in which aluminum panels are heated to a temperature of 750° F. and liquid from an unheated constant volume reservoir is splashed onto the panel and allowed to flow back to the reservoir. After eight hours the panel is washed with toluene and acetone, dried, and the quantity of residue on the test panel is weighed. As will be shown in detail below, the alkylchlorophenyl organopolysiloxane fluids of the present invention require a much greater time to gel in the gel time test and require a much greater time for the doubling of viscosity than alkylchlorophenylpolysiloxane fluids which contain only the iron salt stabilizer or the hydrocarbon stabilizer. Furthermore, the alkylchlorophenylpolysiloxane fluids which contain only the hydrocarbon stabilizers are very poor in the panel coke test. These data establish the superiority of the fluids of the present invention over fluids which contain only one of the stabilizing additives employed in the practice of the present invention.

The following examples are illustrative of the practice of my invention and are not intended for purposes of limitation. All parts are by weight. The methylchlorophenylpolysiloxane fluid employed in the examples contained an average of 2.22 methyl groups per silicon atom and 0.03 chlorophenyl group per silicon atom with each phenyl group containing an average of about 4 chlorine atoms. This fluid had a viscosity at 25° C. of about 70 centipoises.

EXAMPLE 1

An iron octoate concentrate was prepared by adding 0.38 part of iron in the form of a 15 percent paste of iron, as the octoate, in low boiling mineral spirits, to 100 parts of the methylchlorophenyl silicone fluid. Air was bubbled rapidly through this mixture while the temperature was raised to 280° C. over a period of about 90 minutes. Bubbling of air was continued while the mixture was cooled to about 200° C. and then discontinued while the mixture was cooled to room temperature. The precipitate was filtered from this aerated material and the filtrate constituted the iron salt stabilizer. Fluids were prepared by adding various parts of this iron salt stabilizer alone, various parts of benzo(a)pyrene alone, and mixture of various amounts of the iron octoate concentrate and benzo(a)pyrene to the methylchlorophenylpolysiloxane fluid. In those runs in which the benzo(a)pyrene alone was added to the fluid, the addition was accomplished by adding the desired amount of the benzo(a)pyrene to the alkylchlorophenyl organopolysiloxane fluid and heating the mixture from 100° C. to 200° C. in 0.75 hour while nitrogen was bubbling into the mixture to provide agitation. In those runs in which both the iron salt stabilizer and the benzo(a)pyrene were added to the fluid, the iron salt stabilizer was first added and then the fluid containing the concentrate was heated to 100° C., the benzo(a)pyrene was then added, and air was bubbled into the fluid as the mixture was heated from 100° C. to 260° C. and maintained at this latter temperature for ¼ hour. Each of the various fluids prepared were subjected to the oxidation stability test. In Table I below are listed the time required for viscosity doubling in the oxidation test, the percent of the iron salt stabilizer and the percent of the benzo(a)pyrene in each fluid.

*Table I*

| Fluid | Percent iron salt stabilizer | Percent benzo(a) pyrene | Viscosity doubling time, hrs. |
|---|---|---|---|
| A | None | None | 22 |
| B | 1.75 | None | 45 |
| C | None | 0.05 | 70 |
| D | 1.75 | 0.05 | 170 |
| E | 3.50 | None | 110 |
| F | None | 0.1 | 135 |
| G | 3.50 | 0.1 | 260 |

EXAMPLE 2

An iron salt stabilizer was prepared by adding 0.75 part of iron as a 15 percent iron-containing iron octoate paste in mineral spirits to 100 parts of the methylchlorophenylsiloxane and the resulting mixture was heated to a temperature of 280° C. over a 2.5 hour period during which time air was bubbled rapidly into the reaction mixture. At the end of this time the reaction mixture was allowed to cool to room temperature and the precipitate which formed was filtered from the reaction mixture, resulting in a homogeneous filtrate which was another of the iron salt concentrates employed in the practice of the present invention. To a first portion of the methylchlorophenyl silicone fluid was added sufficient amount of this iron salt stabilizer to provide 2 percent by weight of the stabilizer. To portions of this 2 percent solution were added varying amounts of pyrene. In each case the pyrene was added to the solution by heating the mixture at a temperature of about 150° C. with stirring so as to dissolve. To samples of the unmodified methylchlorophenyl organopolysiloxane fluid were also added varying amounts of pyrene. Each of these samples, as well as a control sample which contained neither additive, was placed in a 250° C. air-circulating oven and the time required for gelation was determined. In addition, the samples were subjected to the panel coke test and the oxidation test. In Table II below are listed the fluids, the percent of iron salt stabilizer in each fluid, the percent pyrene in each fluid, the number of hours required for gelation of each fluid, the viscosity doubling time, and the number of milligrams of residue on the aluminum panel.

*Table II*

| Fluid | Percent iron salt stabilizer | Percent pyrene | Gelation time, hrs. | Viscosity doubling time, hrs. | Panel coke residue, mg. |
|---|---|---|---|---|---|
| H | None | None | 54 | 22 | 750 |
| I | 2 | None | 93 | 77 | 1.6 |
| J | None | 0.05 | | | 495 |
| K | None | 0.1 | 45 | | |
| L | None | 0.2 | | 140 | 880 |
| M | 2 | 0.05 | | 150 | |
| N | 2 | 0.1 | 107 | 170 | 1.4 |
| O | 2 | 0.2 | 226 | | 3.4 |

As shown by the table above, the alkylchlorophenyl organopolysiloxane fluid containing both pyrene and the iron salt stabilizer is far superior in oxidative stability to the fluid which contains neither additive or to fluids which contain only one of the additives.

EXAMPLE 3

This example shows the effect of mineral spirits in methylchlorophenyl silicone fluids and the effect of both mineral spirits and an iron salt stabilizer in the same fluids. To a sample of the methylchlorophenyl silicone fluid was added sufficient mineral spirits to provide 0.1 percent by weight of mineral spirits. The mineral spirits employed was the material sold commercially as Soltrol 170 which has an initial boiling point of about 420° F. and a final boiling point of about 475° F. Varying amounts of these mineral spirits were also added to the 2 percent iron salt stabilizer-containing fluid described in Example 2. In Table III below are listed the percent of iron salt stabilizer in the alkylchlorophenyl silicone fluid, the percent mineral spirits in the fluid, the gel time of the fluid in the gel test, the viscosity doubling time, and the milligrams of residue of the fluid from the panel coke test.

Table III

| Fluid | Percent iron salt stabilizer | Percent mineral spirits | Gelation time, hrs. | Viscosity doubling time, hrs. | Panel coke residue, mg. |
|---|---|---|---|---|---|
| P | None | None | 54 | 22 | 750 |
| Q | 2 | None | 93 | 77 | |
| R | None | 0.1 | 43 | 35 | 300 |
| S | 2 | 0.1 | 108 | | |
| T | 2 | 0.2 | 214 | 100 | 24.4 |

As shown in Table III above, the methylchlorophenyl silicone fluid containing both the iron salt stabilizer and the mineral spirits is far superior in thermal stability to the alkylchlorophenyl silicone fluid alone or the fluid containing only one of the additives.

EXAMPLE 4

This example illustrates the use of fluoranthene in the stabilized fluids of the present invention. To the methylchlorophenyl silicone fluid was added varying amounts of the iron salt stabilizer of Example 2 and varying amounts of fluoranthene. Table IV below shows the composition of these fluids, the viscosity doubling time obtained in the oxidation test and the milligrams of residue obtained in the panel coke test.

Table IV

| Fluid | Percent iron salt stabilizer | Percent fluoranthene | Viscosity doubling time, hrs. | Panel coke residue, mg. |
|---|---|---|---|---|
| U | 2 | 0.2 | | 11.9 |
| V | 6.3 | None | 90 | |
| W | 6.3 | 0.2 | 150 | 44.2 |

EXAMPLE 5

This example illustrates the use of 1,2-benzanthracene in the present invention. Specifically, varying amounts of 1,2-benzanthracene and the iron salt stabilizer of Example 2 were added to the fluid and the viscosity doubling time and panel coke residue were measured. The results of these measurements are shown in Table V below:

Table V

| Fluid | Percent iron salt stabilizer | Percent 1,2-benzanthracene | Viscosity doubling time, hrs. | Panel coke residue, mg. |
|---|---|---|---|---|
| X | None | 0.1 | 195 | |
| Y | 2 | 0.05 | 170 | |
| Z | 2 | 0.1 | 210 | 14.5 |

EXAMPLE 6

A stabilized fluid within the scope of the present invention was prepared by adding 1.7 parts of the iron salt stabilizer of Example 1 and 0.2 part of acenaphthene to the alkylchlorophenyl silicone fluid. The viscosity doubling time of this additive-containing fluid was 190 hours as compared with 70 hours for the fluid without the hydrocarbon.

While the foregoing examples have illustrated several of the embodiments of my invention, it should be understood by those skilled in the art, that other proportions of the iron salt stabilizer than those specifically shown above, can be employed along with various proportions of the mineral spirits and of the polycyclic aromatic hydrocarbons. In addition, other lower alkylchlorophenyl polysiloxane fluids can be employed in the practice of the present invention and iron salts of other carboxylic acids than those specifically illustrated can be employed in the preparation of the iron salt stabilizer which is employed in the practice of the present invention.

The stabilized fluids prepared by the process of my invention are extremely useful as heat transfer fluids, as hydraulic fluids, and as lubricating fluids in applications where extended service at temperatures in the range of from 225 to 300° C. is required.

What I claim as new and desire to secure by Letters Patent of the United States is:

1. A stabilized lower alkylchlorophenyl polysiloxane fluid containing from 0.05 to 10 parts by weight per 100 parts by weight of said alkylchlorophenyl polysiloxane fluid of an iron salt stabilizer and from 0.01 to 1 percent by weight based on the weight of said alkylchlorophenyl polysiloxane fluid of a hydrocarbon stabilizer selected from the class consisting of mineral spirits having a boiling point of at least 200° C. and a fused ring polycyclic aromatic hydrocarbon of at least three rings, having a melting point no higher than about 200° C. and a boiling point of at least about 200° C. and a room temperature solubility greater than 0.05 percent by weight in the alkylchlorophenyl polysiloxane fluid, said iron salt stabilizer being prepared by adding an iron salt of an organic carboxylic acid to a lower alkylchlorophenyl polysiloxane fluid to form a mixture, bubbling air through said mixture while heating said mixture at an elevated temperature, and thereafter filtering the precipitate which is formed during the bubbling operation to provide as a filtrate the iron salt stabilizer, said alkylchlorophenyl polysiloxane fluids having the formula

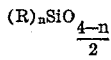

$$(R)_n SiO_{\frac{4-n}{2}}$$

where R represents both lower alkyl radicals and chlorinated phenyl radicals containing an average of from 3 to 5 chlorine atoms per phenyl nucleus with the chlorinated phenyl radicals constituting from 1 to 7 percent of the total number of lower alkyl and chlorophenyl radicals, and $n$ has an average value of from about 2.01 to 2.5, the viscosity of said alkylchlorophenyl polysiloxane fluid being about 10 to 100,000 centipoises when measured at 25° C.

2. A stabilized methylchlorophenyl polysiloxane fluid containing from 0.05 to 10 parts by weight per 100 parts of said methylchlorophenyl polysiloxane fluid of an iron salt stabilizer and from 0.01 to 1 percent by weight based on the weight of said methylchlorophenyl polysiloxane fluid of a hydrocarbon stabilizer selected from the class consisting of mineral spirits having a boiling point of at least 200° C. and a fused ring polycyclic aromatic hydrocarbon having at least three rings, having a melting point no higher than about 200° C., having a boiling point of at least about 200° C., and being soluble at room temperature to the extent of at least about 0.05 percent by weight, based on the weight of the methylchlorophenyl polysiloxane fluid, said iron salt stabilizer having been prepared by adding iron octoate to a methylchlorophenyl polysiloxane fluid to form a mixture, bubbling air through said mixture while heating said mixture at an elevated temperature, and thereafter filtering the precipitate which is formed during the bubbling operation to form a filtrate which is the iron salt stabilizer, said methylchlorophenyl polysiloxane fluids having a viscosity of from about 10 to 100,000 centipoises when measured at 25° C. and containing an average of from 2.01 to 2.5 total methyl and chlorinated phenyl radicals per silicon atom, the chlorinated phenyl radicals containing an average of from 3 to 5 chlorine atoms per phenyl nucleus and constituting from 1 to 7 percent of the total number of methyl and chlorinated phenyl radicals.

3. The fluid composition of claim 2, in which the hydrocarbon stabilizer is mineral spirits.

4. The fluid composition of claim 2, in which the hydrocarbon stabilizer is a fused ring polycyclic aromatic hydrocarbon of at least three rings, having a melting point no higher than about 200° C., having a boiling point of at least 200° C., and being soluble at room temperature to the extent of at least about 0.05 percent by weight in the alkylchlorophenyl polysiloxane fluid.

5. The fluid composition of claim 2 in which the hydrocarbon stabilizer is benzo(a)pyrene.

6. The fluid composition of claim 2 in which the hydrocarbon stabilizer is pyrene.

7. The fluid composition of claim 2 in which the hydrocarbon stabilizer is acenaphthene.

8. The fluid composition of claim 2 in which the hydrocarbon stabilizer is fluoranthene.

9. The fluid composition of claim 2 in which the hydrocarbon stabilizer is 1,2-benzanthracene.

References Cited in the file of this patent

UNITED STATES PATENTS

| | | |
|---|---|---|
| 2,191,089 | Barth | Feb. 20, 1940 |
| 2,195,659 | Shoemaker | Apr. 2, 1940 |
| 2,363,880 | Lieber et al. | Nov. 28, 1944 |
| 2,427,766 | Diamond | Sept. 23, 1947 |
| 2,445,567 | Elliott | July 20, 1948 |

FOREIGN PATENTS

| | | |
|---|---|---|
| 809,360 | Great Britain | Feb. 25, 1959 |